US011435179B2

(12) United States Patent
Wiest

(10) Patent No.: US 11,435,179 B2
(45) Date of Patent: Sep. 6, 2022

(54) DEVICE FOR CALIBRATING A SPEED OF AN AXIS OF MOTION OF A MACHINE

(71) Applicant: M & H Inprocess Messtechnik GmbH, Waldburg (DE)

(72) Inventor: Christoph Wiest, Weingarten (DE)

(73) Assignee: M&H Inprocess Messtechnik GmbH, Waldburg (DE)

( * ) Notice: Subject to any disclaimer, the term of this patent is extended or adjusted under 35 U.S.C. 154(b) by 0 days.

(21) Appl. No.: 17/651,431

(22) Filed: Feb. 17, 2022

(65) Prior Publication Data

US 2022/0170738 A1    Jun. 2, 2022

Related U.S. Application Data

(63) Continuation of application No. PCT/EP2020/070405, filed on Jul. 20, 2020.

(30) Foreign Application Priority Data

Aug. 22, 2019  (DE) ..................... 10 2019 122 654.6

(51) Int. Cl.
*G01B 5/008*    (2006.01)
*G01B 21/04*    (2006.01)

(52) U.S. Cl.
CPC .................. *G01B 21/042* (2013.01)

(58) Field of Classification Search
CPC .................................................. G01B 21/042
(Continued)

(56) References Cited

U.S. PATENT DOCUMENTS 4,932,136 A * 6/1990 Schmitz ............... G01B 21/042
73/1.79
5,125,261 A * 6/1992 Powley .................... G01B 3/30
33/502
(Continued)

FOREIGN PATENT DOCUMENTS

DE    100 20 842 A1    10/2001
DE    101 24 493 A1    11/2001
(Continued)

OTHER PUBLICATIONS

German Search Report (Application No. 10 2019 122 654.6) dated Apr. 24, 2020.
(Continued)

*Primary Examiner* — George B Bennett
(74) *Attorney, Agent, or Firm* — Burr & Brown, PLLC

(57) ABSTRACT

A device for calibrating the speed of a movement axis of a machine, including a measuring instrument and a measuring assembly having first and second measuring elements provided at a defined and known distance from one another on the measuring assembly. The measuring assembly is arranged on a workpiece receptacle of the machine, and the measuring instrument performs measurements with a known target frequency. When the device is arranged on the machine and the measuring instrument is moved at a known target speed of a movement axis of the machine from the first measuring element to the second measuring element, the measuring instrument interacts with the respective measuring element to determine an interaction date or a detection date. The device detects starting from the first interaction date or detection date to the second interaction date or detection date, a number of measurements of the measuring instrument.

14 Claims, 2 Drawing Sheets

(58) Field of Classification Search
USPC .......................................................... 33/502
See application file for complete search history.

(56) References Cited

U.S. PATENT DOCUMENTS

| | | | | |
|---|---|---|---|---|
| 6,023,850 | A * | 2/2000 | Trapet | G01B 21/042 |
| | | | | 33/502 |
| 6,493,956 | B1 * | 12/2002 | Matsuda | G01B 21/042 |
| | | | | 33/502 |
| 6,580,964 | B2 * | 6/2003 | Sutherland | G01B 21/042 |
| | | | | 700/193 |
| 6,591,208 | B2 | 7/2003 | Lotze et al. | |
| 6,806,968 | B2 | 10/2004 | Ruck | |
| 7,055,367 | B2 * | 6/2006 | Hajdukiewicz | G01B 21/042 |
| | | | | 702/155 |
| 7,197,836 | B2 * | 4/2007 | Kikuti | G01B 21/042 |
| | | | | 33/503 |
| 7,395,606 | B2 | 7/2008 | Crampton | |
| 9,140,534 | B2 * | 9/2015 | Manlay | G01B 21/042 |
| 10,288,422 | B2 | 5/2019 | Uhl et al. | |
| 10,378,872 | B2 * | 8/2019 | Sakai | B23Q 17/00 |
| 11,175,130 | B2 | 11/2021 | Maier et al. | |
| 2007/0043526 | A1 | 2/2007 | De Jonge et al. | |
| 2016/0138911 | A1 | 5/2016 | Wallace et al. | |
| 2017/0010094 | A1 | 1/2017 | Iseli et al. | |
| 2018/0262748 | A1 * | 9/2018 | Shibata | H04N 13/257 |
| 2021/0223020 | A1 * | 7/2021 | Asanuma | B23Q 17/2233 |
| 2022/0074732 | A1 * | 3/2022 | Shepherd | G01B 11/005 |

FOREIGN PATENT DOCUMENTS

| | | |
|---|---|---|
| DE | 10 2015 116 850 A1 | 4/2017 |
| DE | 10 2016 226 073 A1 | 6/2018 |
| JP | 4868235 B2 | 2/2012 |

OTHER PUBLICATIONS

International Search Report and Written Opinion (Application No. PCT/EP2020/070405) dated Oct. 30, 2020 (with English translation).

* cited by examiner

DEVICE FOR CALIBRATING A SPEED OF AN AXIS OF MOTION OF A MACHINE

CROSS REFERENCE TO RE TED APPLICATIONS

This application is a continuation of International Application No. PCT/EP2020/070405 filed Jul. 20, 2020, which designated the United States, and claims the benefit under 35 USC § 119(a)-(d) of German Application No. 10 2019 122 654.6 filed Aug. 22, 2019, the entireties of which are incorporated herein by reference.

FIELD OF THE INVENTION

The present invention relates to a device for calibrating speed of an axis of motion of a machine.

BACKGROUND OF THE INVENTION

Measuring systems for the scanning acquisition of measured values are known.

A known measuring system includes an optical measuring instrument which is designed to be capable of being arranged on a machine axis of a machine tool or measuring machine. By means of the optical measuring instrument, several measured values, for instance, are capable of being acquired in succession in a temporal sequence. If during a measurement the measuring instrument is moved over an object to be measured, varying points of the object to be measured can therefore be gauged with the measuring instrument during the motion of the measuring instrument. By this means, a height profile, for instance, of the object to be measured is capable of being generated.

With this known measuring system, it is comparatively complicated to bring the generated measured values into conformity with the measured points of the object, the measurement coordinates. In known measuring systems, the speed of motion of the measuring instrument during the measurement correlates with an accuracy of determination of the point of measurement. The more accurately the point of measurement is to be determined, the more slowly the measurement proceeds or, conversely, the more quickly a measurement is made, the more inaccurate the determination of the point of measurement.

SUMMARY OF THE INVENTION

The object underlying the present invention is to make available an alternative device for calibrating or for normalizing a speed of an axis of motion of a machine. For instance, by virtue of the proposed device an improved calibration or an improved normalization of a measuring instrument of a measuring system is capable of being carried out. In particular, it is an object of the present invention to make available an improved measuring system with a device for calibrating or normalizing a speed of an axis of motion of a machine.

The present invention takes as its starting-point a device for calibrating or for normalizing a speed of an axis of motion of a machine, the machine taking the form of a machine tool or a measuring machine.

An essential aspect of the present invention can be seen in the fact that the device exhibits a measuring instrument and a measuring assembly, the measuring assembly exhibiting a first and a second measuring element, the first and the second measuring element being present on the measuring assembly at a defined and known separation from one another, the measuring assembly being designed to be arranged on a workpiece receptacle of the machine, the measuring instrument being designed to be arranged on a tool receptacle of the machine, the measuring instrument being designed to carry out measurements at a known set frequency, the device being so designed that when, in the state where the device is arranged on the machine, the measuring instrument is moved at a known set speed of an axis of motion of the machine from the first measuring element to the second measuring element the device, in particular, the measuring instrument, interacts with the respective measuring element, or the device, in particular, the measuring instrument, detects the respective measuring element and in the process the device ascertains, in each instance, an interaction date or an acquisition date, the device being designed to ascertain a number of measurements by the measuring instrument starting from the first interaction date or starting from the first acquisition date up until the second interaction date or up until the second acquisition date, the device further being designed to ascertain, by the ascertainment of the number of measurements, an, in particular, real spatial separation of two different measurements by the measuring instrument for the known set speed of the axis of motion of the machine. Advantageously, on the basis of the real spatial separation between the two different measurements and on the basis of known times at which the measurements were undertaken, a real speed of the axis of motion of the machine is capable of being ascertained.

The machine is present in the form of a CNC machining center, for instance. For example, the machine tool takes the form of a turning and/or milling center. The machine tool advantageously encompasses several machine axes capable of being moved relative to one another. For instance, the machine tool takes the form of a 3-axis or 5-axis machine tool. For instance, the measuring machine takes the form of a coordinate-measuring machine.

A speed of motion of the axis of motion of the machine is advantageously constant. In particular, the set speed of the axis of motion of the machine is constant. For instance, the workpiece receptacle is present on an axis of motion of the machine. For instance, the workpiece receptacle has been formed on a machine table of the machine. It is also conceivable that the machine table is present in immovable manner. A relative motion of all the axes of motion of the machine with respect to one another is advantageously known.

The tool receptacle of the machine is advantageously arranged on a further axis of motion of the machine, which is advantageously different from the axis of motion of the machine on which the workpiece receptacle is present. The measuring instrument preferably includes an attachment member for mounting the measuring instrument onto the workpiece receptacle.

The direction of motion and/or the speed of motion of the measuring instrument is/are preferably to be considered in relation to the measuring assembly. Correspondingly, it is conceivable that during a measurement relative to an environment, for example, an environment of a machine on which the measuring instrument is arranged, the measuring instrument is present in a fixed position and instead the measuring assembly is moved relative to the measuring instrument and/or relative to the environment. It is also conceivable that both the measuring instrument and the measuring assembly are moved relative to one another and relative to the environment.

The measuring instrument is preferably designed to enter into an interaction with the respective measuring element. For example, the measuring element and the measuring instrument influence one another.

For instance, the measuring instrument generates a measured value, in particular several measured values, in the course of a measurement. The measuring instrument advantageously generates measured values at a definite frequency, for example, at a definite scanning-rate. The definite frequency is advantageously capable of being predetermined as set frequency. However, it is conceivable that the predetermined set frequency differs from the real frequency, for example, from the real actual frequency at which the measured values are generated by the measuring instrument.

A measured value is available, for instance, in the form of a spatial separation between the measuring instrument and a measuring element or an object of measurement. Within a temporal interval the measuring instrument advantageously generates several measurements temporally separated from one another. For instance, the device is designed to ascertain a number of measurements by the measuring instrument in the interval between the two interaction dates, the interaction dates, for instance, delimiting the interval and being contained within the interval. For instance, the frequency of the generation of measured values is a ratio of a number of measurements within the interval and the temporal length of the interval. Measured values on or at the interval limits advantageously count toward the number of measurements within the interval. The set frequency—and, in particular, the actual frequency—amounts, for instance, to between 20 Hz and 1000 Hz.

For instance, the device ascertains a number of measurements by the measuring instrument between the two interaction dates. The device is advantageously designed to ascertain a number of measurements by the measuring instrument starting from the first interaction date, in particular, inclusive of the first interaction date, up until the second interaction date, in particular, inclusive of the second interaction date. It is conceivable that the device ascertains precisely two measurements by the measuring instrument: a first measurement on the first interaction date, and a second measurement on the second interaction date. By this means, for the purpose of ascertaining or determining a spatial separation between two measurements at the known set speed of the machine a time base—for example, a timing unit—can be dispensed with.

It likewise proves to be an advantage that the device is designed to determine a temporal separation between the two interaction dates or between the two acquisition dates, the device further being designed to ascertain, by the determination of the temporal separation, a spatial separation, in particular, a real spatial separation, of two different measurements by the measuring instrument for the known set speed of the axis of motion of the machine.

The device is preferably designed to ascertain a number of measurements that are undertaken between the two interaction dates or between the two acquisition dates. For instance, the device is designed to ascertain a number of measurements that are undertaken from the first interaction date up until the second interaction date or from the first acquisition date up until the second acquisition date. The device is advantageously designed to ascertain a spatial separation of two different measurements by the measuring instrument on the basis of the ascertained number of measurements, the known separation of the two measuring elements and the ascertained temporal separation between the two interaction dates or between the two acquisition dates. The measuring instrument is advantageously designed to carry out measurements in succession at a constant temporal separation, for example at the known actual frequency.

For instance, the device is designed to ascertain a real speed of motion—for example, an actual speed—of the measuring instrument arranged on the tool receptacle on the basis of the temporal separation between the two interaction dates or between the two acquisition dates and on the basis of the known separation of the two measuring elements from one another. The device is advantageously designed to ascertain a real speed of motion of the measuring instrument arranged on the tool receptacle relative to the measuring assembly.

In addition, it proves to be an advantage that a measuring member, different from the measuring instrument, is provided for the purpose of determining the interaction dates or the acquisition dates. It is conceivable that for the purpose of determining the interaction dates the measuring instrument does not interact—for example, co-operate—with the measuring elements, but that a measuring member, different from the measuring instrument, of the device is provided for this purpose.

It is conceivable that the measuring member is designed in the manner of a pin, for example as a calibration mandrel. The measuring element is advantageously present in the form of a photoelectric barrier or in the form of a sensing element. For instance, a measuring element—for example, the photoelectric barrier—detects the measuring instrument, in particular the measuring member, in the course of a movement of the measuring instrument from the first measuring element to the second, and thereby brings about an interaction date or an acquisition date, for example, a trigger. By this means, a real average speed of the measuring instrument or of the measuring member from the first to the second measuring element is capable of being ascertained.

In an advantageous configuration of the present invention, the measuring instrument takes the form of a measuring instrument operating in contactless manner.

The measuring instrument is present, for instance, in the form of a measuring sensor. The measuring instrument takes the form, for instance, of a confocal chromatic distance sensor, a laser scanner, a line-scanner and/or an image-forming measuring instrument, for example a CCD sensor. For instance, the measuring instrument is present in the form of a line-scanner. The measuring instrument preferably takes the form of a laser triangulation scanner. The measuring instrument is advantageously present in the form of a scanning measuring instrument, for example, a scanner. For instance, during a measurement the measuring instrument generates measured values point by point, line by line or row by row. It is also conceivable that the measuring instrument uses an interferometric and/or a holographic measuring method.

It is also conceivable that the measuring instrument takes the form of a contacting measuring sensor, in particular, a measuring sensor operating in tactile manner. For instance, the measuring instrument is designed to ascertain a magnitude of the deflection of a sensing element of the measuring sensor operating in tactile manner, and/or a force of the sensing element of the measuring sensor operating in tactile manner.

It further proves to be an advantage that a measuring element is present in the form of a calibration ball or in the form of a photoelectric barrier. The measuring elements are advantageously present on a calibration standard, spaced from one another. It is also conceivable that a measuring element takes the form of a switching element, for example, a switch. It is further conceivable that a measuring element exhibits a CCD sensor.

It is conceivable that the measuring element is present in the form of an object of measurement, for instance, a reference object. The measuring element may be present, for instance, in the form of a calibration ball. It is also conceivable that the measuring element is present in spherical, angular, for example, rectangular, conical or oval form. In particular, a measuring element is present in the form of an artifact. The artifact has, for instance, been specially tailored to and designed for the interaction with the measuring instrument, in order to enable an ascertainment of an interaction date or of an acquisition date.

It is likewise an advantage that the device is designed to ascertain a center of the calibration ball from the interaction with the calibration ball.

For instance, the measuring instrument detects the two measuring elements in the course of the movement from the first measuring element to the second measuring element. For example, the measuring instrument gauges the two measuring elements. For instance, the measuring instrument detects a surface of the measuring element, for example a surface of the calibration ball. Advantageously, a geometric design of the surface of the measuring elements is known to the device. The device is preferably designed to fit the measured values of the measurements by a measuring element to the known surface of the measuring element. By this means, a reference value, for instance, of the measuring element is capable of being ascertained. The reference value of the measuring element is, for instance, a sphere center of the calibration ball. A reference value advantageously constitutes an interaction date or an acquisition date.

It is also an advantage that the measuring member is designed to be arranged on the measuring instrument and that the measuring instrument is designed to arrange the measuring member. For instance, the measuring member is present integrally with the measuring instrument. For instance, the measuring member includes a mounting member, and the measuring instrument includes a mounting element for arranging the measuring member on the measuring instrument. For instance, the measuring member is present in a form capable of being can be screwed onto the measuring instrument. It is also conceivable that the measuring member can be clamped, glued or arranged magnetically on the measuring instrument. It is likewise conceivable that, for the purpose of ascertaining the interaction dates or the acquisition dates, the measuring member is firstly arranged on the tool receptacle of the machine and, after the ascertainment, the measuring member is removed from the tool receptacle, and the measuring instrument is arranged on the tool receptacle.

In addition, it is an advantage that the device exhibits a monitoring unit and a storage unit, the device storing the ascertained spatial separation of two different measurements by the measuring instrument for the known set speed of the axis of motion of the machine together with the known set speed of the axis of motion of the machine in the storage unit in a form capable of being read out. The device advantageously stores the ascertained spatial separation of two different measurements by the measuring instrument for the known set speed of the measuring instrument together with the known set speed of the measuring instrument in the storage unit in a form capable of being read out. For instance, the device is also designed to store also the real actual speed of the measuring instrument in addition to the ascertained spatial separation.

In an advantageous modification, the device is so designed that, in the state where the device is arranged on the machine, further measurements by the measuring instrument are undertaken at the known set speed of the axis of motion of the machine.

On the basis of the aforementioned calibration or normalization of the speed of the axis of motion of the measuring instrument—in particular, the calibration or normalization of the measuring instrument to a set speed of the axis of motion of the machine, in particular, the normalization of the measurements relative to one another—to a set speed of the machine, in the course of further measurements with the device at the set speed it is possible to gauge an object of measurement comparatively accurately.

In an advantageous modification of the device, all the measuring elements of the device are of like design. For instance, all the measuring elements of the device are identical. For example, the device includes precisely two measuring elements, precisely three measuring elements or precisely four measuring elements. All the measuring elements are advantageously present at a known separation.

It is further an advantage that the device exhibits a timing unit, the device being designed to synchronize the timing unit of the device with a timer of the machine. For instance, the device includes a monitoring unit. The monitoring unit is advantageously present in the form of an arithmetic logic unit. The monitoring unit includes, for instance, a microcontroller or a microprocessor. The monitoring unit is advantageously capable of being connected to a control unit of the machine. A control unit of the machine takes the form, for instance, of a numerical control, for example, a CNC (computerized numerical control). The monitoring unit is advantageously designed to synchronize the timing unit of the device with the timer of the machine. By this means, a comparatively precise calibration or normalization of the speed of the axis of motion of the machine, in particular, of the measuring instrument, is capable of being realized at a set speed.

In an advantageous embodiment variant, in the state where the device is arranged on the machine the device is designed to assign measurements by the device, starting from a trigger, the ascertained spatial separation of two different measurements and a known direction of motion of the axes of motion of the machine, to machine positions of the measuring instrument, the machine position of the measuring instrument at the time of the trigger being known to the device.

The device, in particular the monitoring unit, is advantageously capable of being connected to the machine in such a manner that, in particular, current machine positions of the measuring instrument are capable of being read out by the device. For example, a temporal retardation, for instance a delay, between a time of interrogation of a machine position and a time of reception of the machine position by the device is known to the device.

Each machine coordinate that the device allocates to a measurement is preferably a machine coordinate of the measuring instrument arranged on the machine. The machine coordinate of the measuring instrument arranged on the machine is advantageously capable of being transformed into a location coordinate of the object of measurement, for example, by normalization. The location coordinate of the object of measurement is advantageously a point of measurement at which the measuring instrument has gauged the object of measurement and thereby generated the measurement.

It is also proposed that the device stores the trigger or the trigger signal, together with a first measurement acquired at the time of the trigger, in a storage unit of the device, a temporal relationship of the trigger and the first measurement being known to the device.

A delay or a retardation-time between the trigger and the receipt of the measurement from the measuring instrument is advantageously known to the device. In particular, this delay or this retardation is constant. By this means, an assignment of the measurement to an associated point of measurement, for example, to a machine coordinate, has been made possible.

For instance, after the trigger has been brought about, the measuring instrument concludes an acquisition of the measurements. For example, the first measurement is the last—viewed temporally—generated measurement of the measurement acquisition. For instance, the first measurement is the last—viewed temporally—measurement of the measurement acquisition processed by the monitoring unit.

It is further proposed that the monitoring unit is designed to communicate the trigger signal to the control unit of the machine via an interface. By this means, an axial motion of the machine is capable of being controlled; in particular, a motion of the axis of motion of the machine is capable of being brought to a halt by reason of the trigger.

It is also an advantage that the device is designed to read out a first machine coordinate acquired at the time of the trigger, in particular, a machine coordinate of the measuring instrument arranged on the machine, from the machine, a temporal relationship of the trigger and the first machine coordinate being known to the device, the monitoring unit being designed to establish a temporal relationship between the first machine coordinate and the first measurement. By this means, the creation of a height profile of an object of measurement to be gauged is capable of being realized.

An advantageous embodiment variant of the present invention is a measuring system comprising a measuring instrument and a device according to one of the variants described above.

Another advantageous embodiment of the present invention is a machine, in particular, a machine tool or measuring machine, with a device according to one of the variants described above or with a measuring system as stated above.

It is likewise an advantage that, starting from the correlation of the first measurement with the first machine coordinate, the device is designed to allocate machine coordinates, in particular machine coordinates of the measuring instrument, to further measurements acquired by the measuring instrument solely by virtue of the fact that an, in particular, real speed of motion and a direction of motion of the measuring instrument are known during or at the time of the acquisition of the measurements. By this means, a comparatively precise gauging of the object of measurement is capable of being realized with the device with a comparatively short measuring-time.

BRIEF DESCRIPTION OF THE DRAWINGS

Several exemplary embodiments will be elucidated in more detail with reference to the following schematic drawings, with specification of further particulars and advantages.

DETAILED DESCRIPTION OF THE INVENTION

Figure 1:
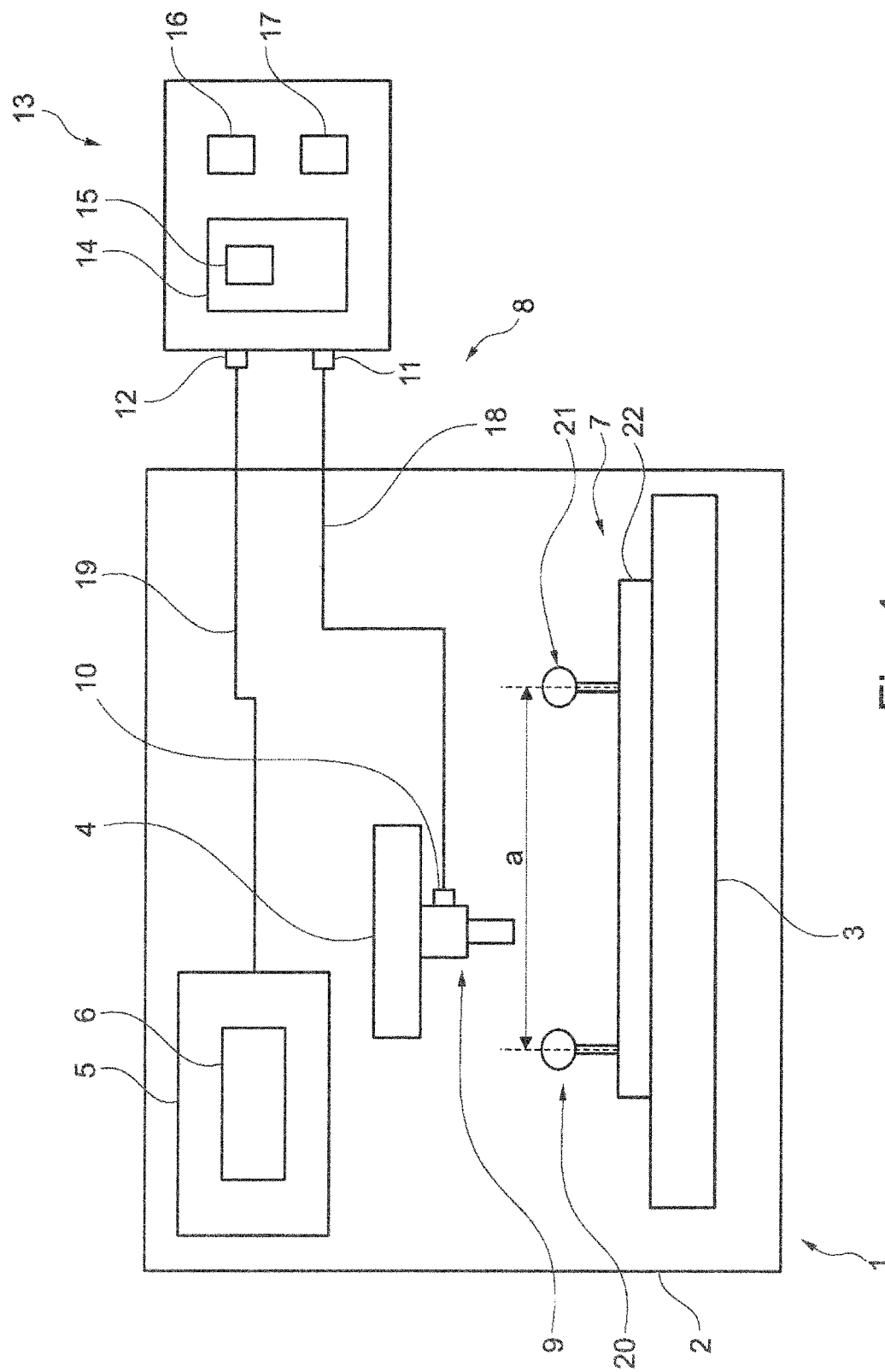
FIG. 1 shows a schematic representation of a machine with a measuring system with a device.

FIG. 1 shows a machine 1 with a schematically represented enclosure 2, with a machine table 3, with an axis of motion 4 and with a control unit 5. The machine 1 includes, for instance, a memory module 6 which, for example, is present on the control unit 5. A device 7 is arranged on the machine table 3 in exemplary manner.

A measuring system 8 is advantageously arranged on the machine 1. The measuring system 8 includes a measuring instrument 9, a first interface 10, a second interface 11 and, for instance, a third interface 12. The measuring system 8 further includes, for instance, a transceiver unit 13. The transceiver unit 13 exhibits, for instance, a monitoring unit 14 with a control module 15. The measuring system 8 may further include a storage unit 16 and a timing unit 17.

In the embodiment variant according to FIG. 1, the measuring instrument 8 is coupled with the transceiver unit 13 in exemplary manner via the interfaces 10, 11 by means of a signal line 18. The signal line 18 is present, for instance, in the form of a wireless transmission channel. The signal line 18 takes the form of, for instance, a radio link or a radio channel. It is also conceivable that the signal line 18 takes the form of an optical connection, for example, an optical line channel. In addition, the transceiver unit 13 is connected to the machine 1, in particular to the control unit 5 of the machine 1, by means of interface 12 via a further signal line 19.

It is further conceivable that interface 12 takes the form of a standard interface, for example, a USB interface or network interface. For instance, this interface 12 is designed to interrogate position coordinates of the machine 1 by means of the monitoring unit 14.

The device 7 includes a first measuring element 20 and a second measuring element 21. The two measuring elements 20, 21 are advantageously present in the form of calibration balls. The two measuring elements 20, 21 are arranged, for instance, on a calibration standard 22. The calibration standard 22 is advantageously present in comparatively length-invariant form, particularly with regard to a change of temperature of the environment.

The two measuring elements 20, 21 are arranged on the calibration standard 22 at a known and constant separation a from one another. The separation a of the measuring elements 20, 21 from one another extends, for instance, from a perpendicular that passes through a sphere center of the first measuring element 20, which takes the form of a calibration ball, as far as a perpendicular that passes through a sphere center of the second measuring element 21 which takes the form of a calibration ball.

For the purpose of normalizing or calibrating the speed of the axis of motion of the machine, in particular of the measuring instrument 9, the measuring instrument 9 is advantageously moved by means of the axis of motion 4, in particular along an extension of the separation a from the first measuring element 20 to the second measuring element 21.

Figure 2:
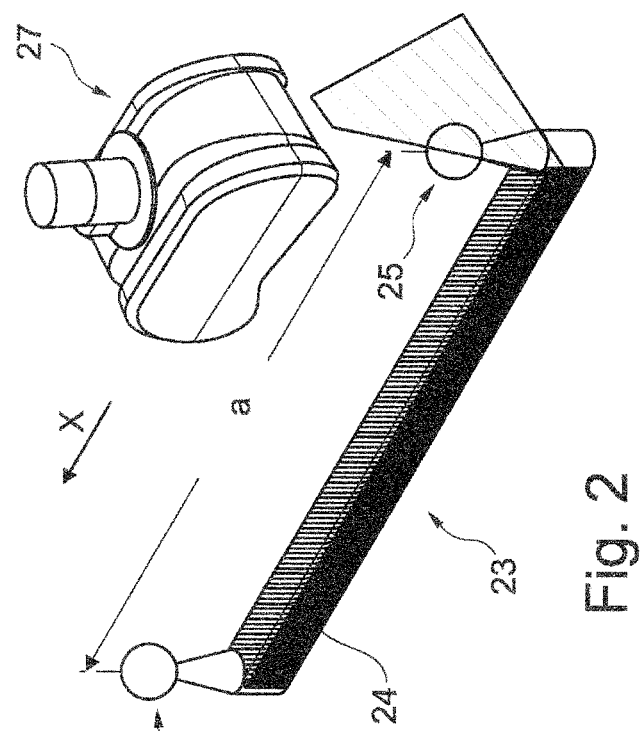
FIG. 2 shows a second variant of the device.

FIG. 2 shows a variant of a device 23. The device 23 includes a calibration standard 24 on which calibration balls 25, 26 are arranged, spaced from one another. The separation of the calibration balls 25, 26 from one another is known and is advantageously comparatively constant by reason of the calibration standard 24. The device 23 according to FIG. 2 includes, in addition, a measuring instrument in the form of a laser triangulation scanner 27. In the course of a measurement, the laser triangulation scanner 27 acquires several measured values which are present next to one another in a line, the line advantageously extending at right angles to a direction of motion of the laser triangulation scanner 27.

For the purpose of calibration with the laser triangulation scanner 27, the laser triangulation scanner 27 is moved in direction X at a known and advantageously constant speed of motion, in particular, at the known set speed. In the process, the laser triangulation scanner 27 detects the calibration balls 25, 26. The laser triangulation scanner 27 advantageously detects the calibration balls 25, 26 with a measurement, in particular with several measurements. On the basis of the known diameters of the calibration balls 25, 26, the device 23 is designed to fit a surface of the calibration balls 25, 26 to the measurements on the basis of the measurements, as a result of which, in each instance, a sphere center of the calibration balls 25, 26 is capable of being determined. A separation of the sphere centers of the calibration balls 25, 26 is advantageously known to the device 23. The device 23 is further designed to determine a number of measurements that have been undertaken while the laser triangulation scanner 27 was being moved from the center of the first calibration ball 25 to the center of the second calibration ball 26. For instance, the device 23 is designed, in addition, to determine a separation between two measurements on the basis of the known separation of the sphere centers of the calibration balls 25, 26 and the definite number of measurements between the sphere centers of the calibration balls 25, 26. By this means, the laser triangulation scanner 27 is capable of being calibrated for the known set speed.

Figure 3:
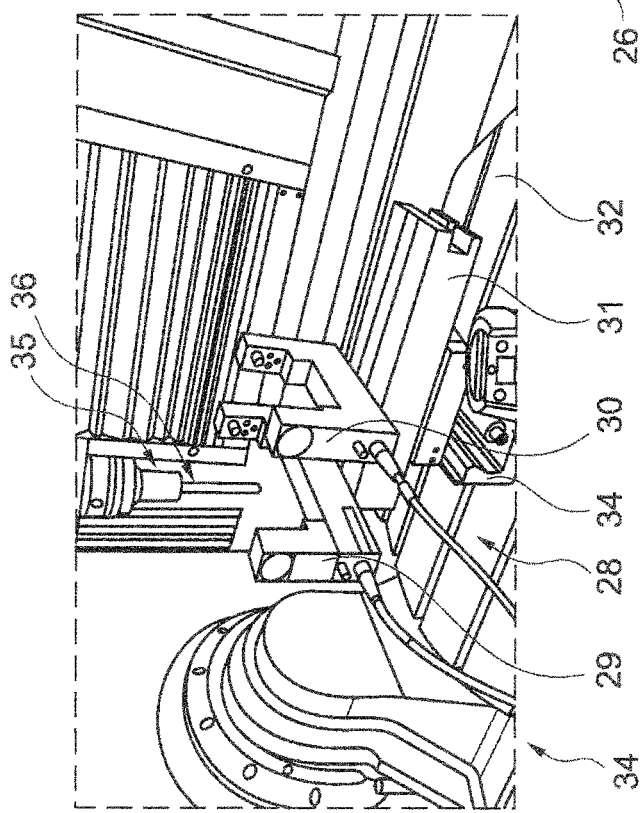
FIG. 3 shows a further variant of the device.

FIG. 3 shows a further variant of a device 28. The device 28 includes a first measuring element, in the form of a first photoelectric barrier 29, and a second measuring element in the form of a second photoelectric barrier 30. The first and second photoelectric barriers 29, 30 are fastened to a calibration standard 31 at a defined and known separation from one another. The calibration standard 31 is, in turn, fastened to a machine table 32 of a machine 33 by means of a workpiece receptacle 34.

A measuring member in the form of a measuring mandrel 36 is arranged on a tool receptacle 35 of the machine 33. In this variant of the device 28, interaction dates are ascertained by the measuring mandrel 36 being moved through the photoelectric barriers 29, 30 and by the photoelectric barriers 29, 30 thereby detecting the measuring mandrel 36 and each bringing about an interaction date. By this means, a real average speed of motion of the measuring mandrel 36 or of a machine axis of the machine 33 is capable of being ascertained.

LIST OF REFERENCE SYMBOLS

1 machine
2 enclosure
3 machine table
4 axis of motion
5 control unit
6 memory module
7 device
8 measuring system
9 measuring instrument
10 interface
11 interface
12 interface
13 transceiver unit
14 monitoring unit
15 control module
16 storage unit
17 timing unit
18 signal line
19 signal line
20 measuring element
21 measuring element
22 calibration standard
23 device
24 calibration standard
25 calibration ball
26 calibration ball
27 laser triangulation scanner
28 device
29 photoelectric barrier
30 photoelectric barrier
31 calibration standard
32 machine table
33 machine
34 workpiece receptacle
35 tool receptacle
36 measuring mandrel

The invention claimed is:

1. A device for calibrating or for normalizing a speed of an axis of motion of a machine, the machine taking the form of a machine tool or a measuring machine, the device comprising a measuring instrument and a measuring assembly, the measuring assembly comprising first and second measuring elements, the first and second measuring elements being present at a defined and known separation from one another on the measuring assembly, the measuring assembly being designed to be arranged on a workpiece receptacle of the machine, the measuring instrument being designed to be arranged on a tool receptacle of the machine, the measuring instrument being designed to carry out measurements at a known set frequency, the device being so designed that when, in the state where the device is arranged on the machine, the measuring instrument is moved from the first measuring element to the second measuring element at a known set speed of an axis of motion of the machine the measuring instrument interacts with the respective measuring element or the measuring instrument, detecting the respective measuring element, and the device ascertaining, in each instance, an interaction date or an acquisition date, the device being designed to acquire a number of measurements by the measuring instrument starting from the first interaction date or acquisition date up until the second interaction date or up until the second acquisition date, the device being further designed to ascertain a spatial separation of two different measurements by the measuring instrument for the known set speed of the axis of motion of the machine by the acquisition of the number of measurements.

2. The device as claimed in the preceding claim 1, wherein the device is designed to determine a temporal separation between two interaction dates or between two acquisition dates, the device being further designed to ascertain a spatial separation of two different measurements by the measuring instrument for the known set speed of the axis of motion of the machine by the determination of the temporal separation.

3. The device as claimed in claim 1, wherein a measuring member, different from the measuring instrument, is provided for the purpose of determining the interaction dates or the acquisition dates.

4. The device as claimed in claim 1, wherein the measuring member is designed to be arranged on the measuring instrument, and wherein the measuring instrument is designed to arrange the measuring member.

5. The device as claimed in claim 1, wherein in the state where the device is arranged on the machine further measurements by the measuring instrument are undertaken at the known set speed of the axis of motion of the machine.

6. The device as claimed in claim 1, wherein the device comprises a monitoring unit and a storage unit, the device storing the ascertained spatial separation of two different measurements by the measuring instrument for the known set speed of the axis of motion of the machine together with the known set speed of the axis of motion of the machine in the storage unit in a form capable of being read out.

7. The device as claimed in claim 1, further comprising a measuring element in the form of a calibration ball or in the form of a photoelectric barrier.

8. The device as claimed in claim 1, wherein all the measuring elements of the device are of like design.

9. The device as claimed claim 7, wherein the device is designed to ascertain a center of the calibration ball from the interaction with the calibration ball.

10. The device as claimed in claim 1, further comprising a timing unit, the device being designed to synchronize the timing unit of the device with a timer of the machine.

11. The device as claimed in claim 1, wherein in the state where the device is arranged on the machine, the device is designed to assign measurements by the device, starting from a trigger, the ascertained spatial separation of two different measurements and a known direction of motion of the axes of motion of the machine, to machine positions of the measuring instrument, the machine position of the measuring instrument at the trigger being known to the device.

12. A measuring system including a device as claimed in claim 1.

13. A machine tool or measuring machine, with a device as claimed in claim 1.

14. A machine tool or measuring machine with a measuring system as claimed in claim 12.

* * * * *